United States Patent [19]

Jones

[11] Patent Number: 5,181,245
[45] Date of Patent: Jan. 19, 1993

[54] MACHINE INCORPORATING AN ACCOUNTS VERIFICATION SYSTEM

[75] Inventor: John L. R. Jones, Laindon, United Kingdom

[73] Assignee: Pitney Bowes plc., Harlow, England

[21] Appl. No.: 706,442

[22] Filed: May 28, 1991

[51] Int. Cl.$^5$ .............................................. H04K 1/00
[52] U.S. Cl. .................... 380/23; 364/464.02; 380/52
[58] Field of Search ................ 380/23, 24, 25, 52, 380/55; 235/432, 382, 382.5, 101; 364/464.02

[56] References Cited

U.S. PATENT DOCUMENTS

| | | | |
|---|---|---|---|
| 3,978,457 | 8/1976 | Check, Jr. et al. | 235/92 EA X |
| 4,097,923 | 6/1978 | Eckert, Jr. et al. | 364/900 |
| 4,376,299 | 3/1983 | Rivest | 364/464.02 X |
| 4,549,281 | 10/1985 | Eckert et al. | 364/464.02 |
| 4,835,697 | 5/1989 | Jones | 364/464.02 |
| 4,837,702 | 6/1989 | Obrea | 364/464.02 X |
| 5,077,792 | 12/1991 | Herring | 380/24 X |

*Primary Examiner*—Tod R. Swann
*Attorney, Agent, or Firm*—Charles G. Parks, Jr.; Melvin J. Scolnick

[57] ABSTRACT

The postage meter incorporates an accounts verification system which ensures that an authority, such as the U.K. General Post Office, is provided with regular and accurate readings without the need for a meter, such as a postage meter, to be read by the authority's inspector. The account verification provides for a system in which the meter is disabled at preset intervals and in which operation of the meter for the next interval is conditional upon the user providing an accurate meter reading to the authority. The meter includes a funding register and a machine inhibiting system. The machine inhibiting system is operable to inhibit operation of the meter following a predetermined period of time or a predetermined number of machine cycles of operation of the machine. A processor system is provided for generating a code dependent on the accounting data stored in the funding register. The processing system is also programmed for comparing said internally generated code with an independently and externally generated code and for resetting the inhibiting system to allow operation of the meter for a further predetermined period of time or predetermined number of cycles of operation of the meter when the internal code and the external code correspond.

4 Claims, 2 Drawing Sheets

MACHINE INCORPORATING AN ACCOUNTS VERIFICATION SYSTEM

FIELD OF THE INVENTION

This invention relates to value-dispensing machines incorporating an accounts verification system. In particular, but not exclusively, the invention relates to a postage meter incorporating an accounts verification system.

BACKGROUND OF THE INVENTION

Certain countries allow the use of postage meters which operate on a "current account" basis. As is well known, a meter includes a register, known as the ascending register, which stores a value representing the total value franked by the postage meter. In a current account system, the ascending register of the meter is read at intervals and the amount used since the last reading is calculated and debited from the user's account. For such systems to work with reasonable economic efficiency accurate readings should be taken from the meters at regular intervals. In practice, this may be difficult to achieve; if the meters are read at regular intervals by inspectors from the authority responsible for receiving payments from the users, accurate readings will be taken but the yearly cost of inspections is high. If the meters are read less frequently then the cash flow of the authority suffers. If the authority relies upon the user to provide intermediate readings between those taken by the authority's inspectors, the user may feel tempted to provide artificially low intermediate readings which again adversely effect the cash flow of the authority even though the balance will be recovered after the next reading taken by the authority's inspectors.

The applicants therefore see a need for a system which ensures that the authority is provided with regular and accurate readings without the need for the meter to be read by the authority's inspector. The applicants according to one embodiment of the invention provide herein a system in which the meter is disabled at preset intervals and in which operation of the meter for the next interval is conditional upon the user providing an accurate meter reading to a data centre. In this way, the authority can be assured of obtaining accurate accounting data at the required preset intervals. Thus the frequency with which the meter is inspected by the authority's inspector may be substantially reduced with a consequent reduction in cost.

SUMMARY OF THE INVENTION

According to one aspect of this invention, there is provided a machine e.g. a postage meter, incorporating an accounts verification system, and having means therein for generating accounting data, said machine including:

a funding register for storing accounting data;

machine inhibit means operable to inhibit operation of said machine following a predetermined period of time or a predetermined number of cycles of operation of the machine;

machine processor means for generating a code dependent on the accounting data stored in said funding register (said code being herein referred to as an internally generated code); and means for comparing said internally generated code with an independently and externally generated code (herein referred to as an external code) and for resetting the inhibit means to allow operation of the meter for a further predetermined period of time or predetermined number of cycles of operation of the machine when the internal code and the external code correspond.

As stated, the machine may be a postage meter. It may however be another form of machine which operates on a cyclical basis and from which accounting data needs to be collected; an example of such a machine is a photocopier apparatus.

The term "accounting data" is used broadly to include both data which directly represents monetary amounts (such as held in the ascending register of a postage meter) and data which indirectly represents monetary amounts, such as data representing the number of cycles performed, or amounts of energy consumed, etc.

BRIEF DESCRIPTION OF THE DRAWINGS

A non-limiting example of the invention will now be described in detail, reference being made to the accompanying drawings, in which.

DETAILED DESCRIPTION OF PREFERRED EMBODIMENTS

Figure 1:
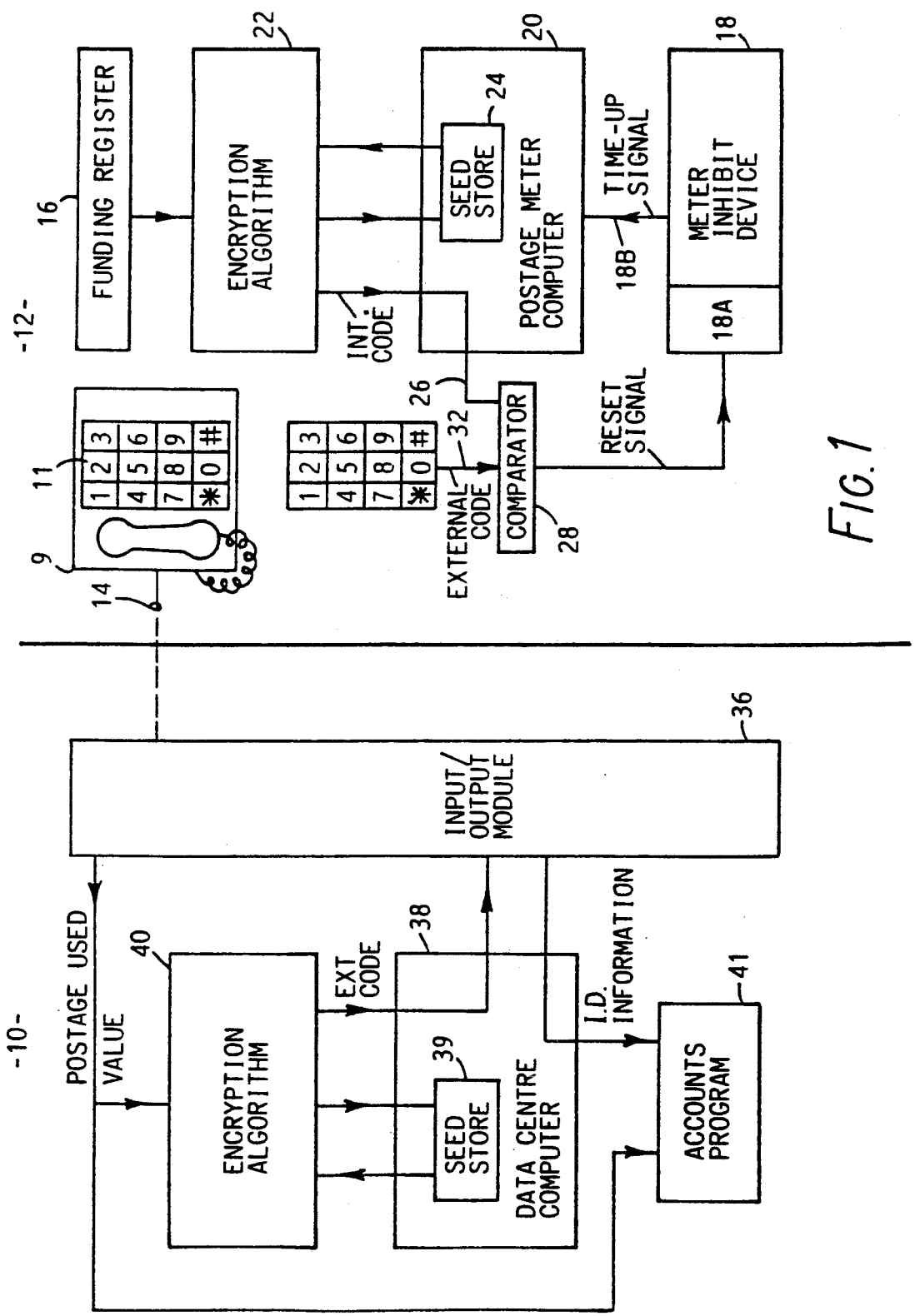
FIG. 1 is a schematic view of a postage meter incorporating an accounts verification system in accordance with the invention.

The system illustrated in FIG. 1 is intended to provide accounts verification of a remote postage meter from a data centre. The system ensures that continued operation of a "current account" remote postage meter is conditional upon the data centre being supplied with accurate accounting data from the postage meter at predetermined intervals.

The system comprises a data centre 10 which can send data to and receive data from each of a plurality of postage meters 12 (only one of which is shown) via respective data links 14 (only one being shown). In the embodiment illustrated in FIG. 1 the data link comprises a telephone 9 at the postage meter connected to the data centre 10. The data centre 10 may, but need not, include an automatic voice answer-back unit (not shown). The data centre 10 may then send data to the postage meter 12 by creating a voice signal which "speaks" a code supplied to the human operator of the postage meter 12 who can then key in the code to the meter 12 via the postage meter keyboard 13. Data can be supplied from the postage meter 12 to the data centre 10 by the human operator who reads the appropriate data from the meter and transmits it along the telephone line to the data centre by means of a touch-tone pad 11 associated with the telephone at the postage meter. It will be understood that other forms of data link 14 may be used. For example, in some circumstances it may be preferred for the postage meter 12 to transmit and receive data directly to and from the telephone line without the need for a human operator. In such a system the postage meters could be permanently connected to a phone line and be polled at regular intervals to determine the contents of the funding register of the postage meter 12. In a simpler alternative according to the invention, communication could be over the phone line between a person operating the meter 12 and a person operating the computer 38.

The present invention is not limited to those methods of communication between the data centre 10 and the postage meter 12. Other methods could be employed. For example: the meter and the data centre could be connected by a direct data line; or could be provided with a modem connecting it to a telephone line; or a so-called "smart card" carrying the external code in a memory therein could be despatched by the data centre to a Post Office convenient for the meter user. The user would then take his meter to that Post Office for resetting, when required.

The postage meter 12 is operated under the control of a microprocessor (not shown) in the meter which increments a current account funding register 16 with the postage value each time a mail piece is franked. The contents of the funding register may be displayed in a conventional manner, on a display (not shown) of the postage meter. The postage meter 12 includes a resettable meter inhibit device 18 which is operable to inhibit further operation of the postage meter following a predetermined interval. In this embodiment the predetermined interval is determined in terms of time, and is set according to the frequency with which the authority responsible for billing the user for use of the machine wishes to receive accounting data. In a typical system the meter inhibit device 18 would inhibit the operation of the postage meter at monthly intervals.

The meter inhibit device 18 may inhibit operation of the meter in a variety of ways; for example it may physically prevent the printing mechanism of the postage meter from franking further values. A man skilled in the art will be familiar with various mechanisms including interposers or shutter bars by which this may be achieved. Alternatively the meter inhibit device 18 may prevent the postage meter from franking values other than zero, or it may disable the computer controlling the machine to prevent further operation, or in the case of a meter including an electrically-driven printer it may cut off the power supply to the printer. A computer in the meter 12, which may (but need not) be the computer 20 described below includes an internal real-time clock; alternatively such a clock (18A) may be included in the meter inhibit device 18. The meter inhibit device 18 is resettable by a reset signal as will shortly be described. When reset, the meter inhibit device 18 allows recommencement of operation of the meter for a further predetermined time interval or for a further specified number of operating cycles.

The postage meter 12 also includes a microcomputer 20, which may be the same as or different from the computer which controls the conventional functions of the postage meter. The computer 20 stores and runs a program which generates the internal code. The internal code (which is used in the process of resetting the meter after it has been inhibited) may be generated in various ways. For example an encryption algorithm 22 may be applied to the particular value at that time stored in the funding register 16. It will be realised that at this time the meter is not operational, having been inhibited by the effluxion of the predetermined time period or by the completion of the pretermined number of cycles of operation. The encryption algorithm 22 may use the aforesaid stored value together with a seed number to encrypt the internal code. For enhanced security, the algorithm 22 may use the value in the register 16 with the stored seed and with the amount of funds it may be desired to add to the funding register to encrypt the internal code. Alternatively, the algorithm 22 could employ the stored value, the seed number, plus numbers representing the day's data to encrypt the internal code. As yet another alternative, the algorithm 22 could employ the stored value, the seed number, plus the control sum value, assuming the meter was of the kind which had ascending and descending registers and kept a control sum. For an example of this kind of meter, the reader is referred to U.S. Pat. No. 3,978,457. In a further alternative, the algorithm 22 could employ the stored value, the seed number and the number of days constituting the aforesaid predetermined time period. The techniques described in U.S. Pat. No. 4,097,923 for generating and using pseudo-random codes may be employed if desired in the present invention.

At the expiry of the predetermined time period, or on completion of the predetermined number of operating cycles, the meter inhibit device outputs a "time up" signal which halts meter operation and provides a visual warning to the meter operator.

It will be understood that the encryption algorithm 22 thus generates the internal code which is a pseudo-random code which has buried therein the value stored in the funding register 16 at the particular when the meter inhibit device operated inhibit operation of the postage meter 12.

The internal code is emitted on line 26 and fed to the comparator 28 which compares it with a number (the external code) which has been supplied to the meter operator via the telephone line 14 and has been supplied (by the operator) to the comparator 28 via the keyboard 13. If the external code and the internal code match, the comparator outputs a reset signal to the meter inhibit device 18 to allow operation of the postage meter for a further predetermined time interval or a predetermined number of operating cycles. Continued operation of the postage meter is thus conditional on the correct external code 32 being entered via the keyboard. Though not shown, the postage meter may incorporate means to limit the number of re-try attempts by the user so that, for example, the postage meter locks out and must be returned to a service centre if more than, say, nine incorrect entries are made.

As well as generating the internal code, the encryption algorithm generates a new seed number and transmits it to the seed store 24 for use in the next resetting operation.

The data centre 10 includes an input/output module 36 to the data centre computer 38. The input/output module 36 may (but need not) include automatic voice answerback facilities and touch-tone demodulators so that the user of the postage meter 12 may communicate with the data centre 10 by means of the telephone 9 and transmit and receive data representing accounting information (i.e. the value held in the funding register 16) and data centre code data (a multi-digit code) respectively. In a simpler embodiment, transmission of this information may be done over the telephone between the user of the meter 12 and the operator of the computer 38. In use, the meter user will also transmit to the data centre computer identifying information particular to the particular meter and user.

The data centre computer 38 is similar in operation to the postage meter computer 20 and also stores and runs a program which applies an encryption algorithm 40 to a postage used value which is input to the computer 38 via the input/output module 36. The postage used value is the value read from the funding register by the postage meter operator. This value is communicated to the data centre, e.g. via the touch-tone pad 11 on the telephone 9. The encryption algorithm 40 is an exact replica of the encryption algorithm 22 in the postage meter so that, if both algorithms are supplied with the same input values, then the same encrypted code number (internal code or external code as the case may be) and the same new seed number will be output by the algorithms. In setting up of the system the same initial seeds are stored in the seed stores 24 of the postage meter computer 20 and 39 of the data centre computer 38.

The data centre computer 38 outputs the encrypted value (i.e. the aforesaid external code) via the input/output module for transmission in voice message form along the data link 14 to the user. The data centre computer 38 also supplies the postage used value input supplied by the user and the meter identification data to an accounts program 40 which calculates the amount owed by the user of that postage meter.

In use, with the postage meter 12 and the data centre 10 having their computers contain the same seed number in the seed stores 24 and 39, the meter inhibit device 18 is enabled so that it starts measuring the required predetermined time period or number of operating cycles during which normal operation of the meter is permitted to occur. At the end of the interval so defined, the meter inhibit device 18 inhibits operation of the meter and sends a time-out signal 18B to the postage meter computer 20 to cause it to run the encryption algorithm 22 to and generate the external code on line 26 as previously described. The time-out signal also prepares the comparator 28 for receiving the external code word 32 via the keyboard.

When operation of the machine has been inhibited, the user dials up the data centre 10 with the telephone 9 and supplies in any convenient way an identification code identifying the user and/or the meter (herein referred to as I.D. information). The user then reads the contents of the funding register 16 (i.e. the postage used value) and communicates this to the data centre computer 38, e.g. using the touch-tone pad 11 on the telephone 9. The data centre computer 38 runs the encryption algorithm 40 to generate a code number or word (the external code) which is sent to the user in any convenient way, e.g. by a voice unit in the input/output module 36. The postage used value and the I.D. information is supplied to the accounts program 41 following any necessary checks. The user keys the external code 32 generated at the data centre 10 into the postage meter 12 via the postage meter keyboard 13. The external code 32 is compared with the internal code and, if they match, the postage meter inhibit device 18 is reset to allow continued operation of the meter for a further predetermined interval.

It will be understood that, in the illustrated embodiment, the system ensures that the user supplies accurate values of postage used to the data centre at regular, predetermined intervals set by the data centre, without requiring physical inspection of the postage meter by the authority.

In the above arrangement, any attempt by the postage meter user to supply false accounting information to the data centre will result in the postage meter code and the external code not matching so that the meter inhibit device will not be reset and so operation of the device will be inhibited.

It will be understood that the length of the predetermined interval may be adjusted as required by adjustment of the meter inhibit device.

The system could be incorporated in postage meters which include the RMRS or "postage-by-post" system (see for example U.S. Pat. No. 4,097,923 in which the meter users operate a deposit account system with the postage meter authority and recharge the postage meter with credit by telephone when the credit remaining is low. The system as described if incorporated in RMRS postage meters could ensure that an accurate value of the ascending register of the meter was obtained at regular intervals irrespective of the amount of credit remaining on the descending register. In this type of system the length of the interval between successive inhibits could be longer than for current account meters; for example it could be six months.

Figure 2:
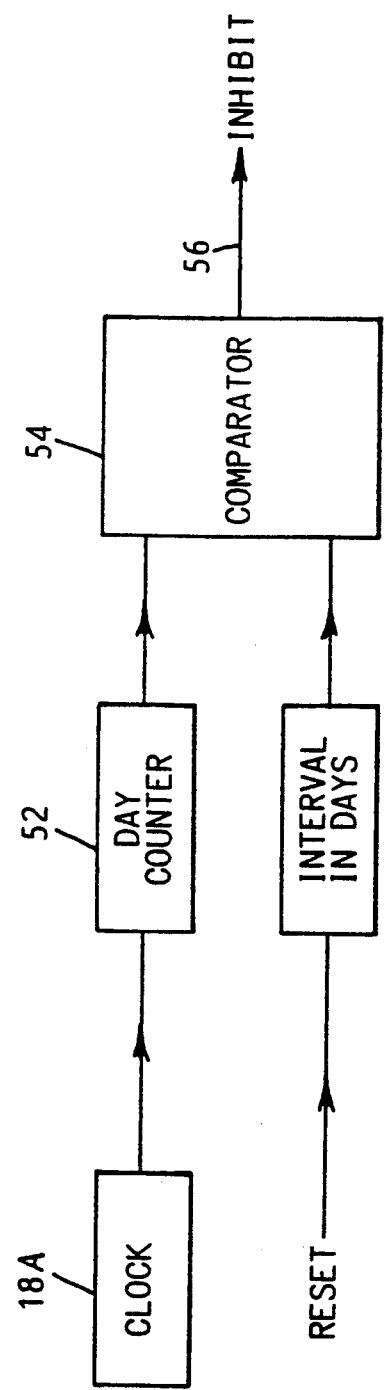
FIG. 2 is a diagram illustrating the organisation of one form of meter inhibit device.

Referring now to FIG. 2, there is illustrated in diagrammatic form the organization of one example of meter inhibit device 18. Such a device includes a real time clock 18A driving a day counter 52 whose output is a number representing the number of days that have elapsed once the meter was enabled. This output is fed to one input of a comparator 54. The other input of the comparator is fed with a signal representing the time interval for which the meter is permitted to operate and at the end of which it is disabled. The comparator compares these two inputs and upon equality thereof issues an inhibit or "time up" signal on its output line 56.

It will be appreciated that while a postage meter system has been particularly described, the system can be used for meters other than postage meters in which the amount paid by the user to the authority controlling the system is calculated in accordance with meters held at the user's premises.

I claim:

1. A machine incorporating an accounts verification system, and having means therein for generating accounting data, said machine including:
    a funding register for storing accounting data inclusive of funds accounting data;
    inhibiting means operable to inhibit operation of said machine following a predetermined period of time or a predetermined number of cycles of operation of the machine where determination of said predetermined period of time and said number of cycles are independent of said funds accounting data;
    machine processor means for generating a code dependent on the accounting data stored in said funding register (said code being herein referred to as an internally generated code); and
    means for comparing said internally generated code with an independently and externally generated code (herein referred to as an external code) and for resetting the inhibiting means to allow operation of the machine for a further predetermined interval when the internal code and the external code correspond.

2. A machine according to claim 1, in combination with a remote processor means arranged to be supplied with data representing the data held in said funding register and for independently and externally generating said external code dependent thereon.

3. A combination according to claim 2, wherein said machine processor means and said remote processor means each operate an encryption program incorporating a similar encryption algorithm.

4. A combination according to claim 2, wherein said remote processor means includes means for receiving and processing (a) data identifying the said machine and (b) accounting data from said machine.

* * * * *